(12) United States Patent  
Gerlach

(10) Patent No.: US 7,079,964 B2
(45) Date of Patent: Jul. 18, 2006

(54) METHOD FOR DETERMINING THE FREQUENCY OF THE CURRENT RIPPLE IN THE ARMATURE CURRENT OF A COMMUTATED DC MOTOR

(75) Inventor: Tobias Gerlach, Hagen (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 409 days.

(21) Appl. No.: 10/678,799

(22) Filed: Oct. 3, 2003

(65) Prior Publication Data

US 2004/0098213 A1    May 20, 2004

Related U.S. Application Data

(63) Continuation of application No. PCT/EP02/05877, filed on May 29, 2002.

(30) Foreign Application Priority Data

May 30, 2001  (DE) ................. 101 26 168

(51) Int. Cl.
*G01R 23/16* (2006.01)
(52) U.S. Cl. .............. 702/76; 702/65; 702/66; 702/191; 318/286
(58) Field of Classification Search ........... 702/64–66, 702/57, 69, 70, 75–78, 189–191, 195; 318/286, 318/721
See application file for complete search history.

(56) References Cited

U.S. PATENT DOCUMENTS

| 3,829,754 A | * | 8/1974 | Rettig ................. 363/37 |
| 3,935,512 A | * | 1/1976 | Falk et al. .............. 361/86 |
| 4,275,451 A | * | 6/1981 | Balzarini et al. ........ 702/108 |
| 4,491,770 A | * | 1/1985 | Gotou ................. 318/254 |
| 4,525,662 A | * | 6/1985 | Kato et al. ............. 322/28 |
| 4,527,101 A |   | 7/1985 | Zavis et al. |
| 4,583,190 A | * | 4/1986 | Sal .................. 708/404 |
| 4,736,307 A | * | 4/1988 | Salb ................. 600/544 |
| 4,744,041 A | * | 5/1988 | Strunk et al. .......... 702/84 |
| 4,924,166 A | * | 5/1990 | Roussel .............. 318/608 |
| 4,952,854 A | * | 8/1990 | Periou et al. .......... 318/257 |
| 5,042,080 A |   | 8/1991 | Kruger |
| 5,224,201 A | * | 6/1993 | Kruger ............... 388/809 |
| 5,359,275 A | * | 10/1994 | Edwards .............. 323/207 |

(Continued)

FOREIGN PATENT DOCUMENTS

DE         195 11 307 C1      3/1995

(Continued)

*Primary Examiner*—Marc S. Hoff
*Assistant Examiner*—Jeffrey R West
(74) *Attorney, Agent, or Firm*—Brooks Kushman P.C.

(57) ABSTRACT

A method for determining the frequency of current ripples contained in the armature current signal of a commutated direct current (DC) motor includes determining frequency spectral results of the current signal and of a motor electric operating parameter. The frequency spectral results are subtracted from one another to determine the frequency spectral result of the current ripples contained in the current signal. The current ripple frequency is determined from the frequency spectral result of the current ripples contained in the current signal. The operating parameter may be the armature voltage signal, or the armature current signal at a different motor operating state than the motor operating state of the current signal used in the step of determining the current signal frequency spectral result. The rotational speed of a motor shaft is determined based on the current ripple frequency. The shaft rotational position is determined based on the rotational shaft speed.

14 Claims, 1 Drawing Sheet

U.S. PATENT DOCUMENTS

| | | | | |
|---|---|---|---|---|
| 5,434,634 | A | * | 7/1995 | Yoshida ........................ 396/319 |
| 5,770,922 | A | * | 6/1998 | Gerrish et al. ........... 315/111.21 |
| 5,977,732 | A | * | 11/1999 | Matsumoto .................. 318/283 |
| 6,002,228 | A | * | 12/1999 | Knab .......................... 318/469 |
| 6,038,532 | A | * | 3/2000 | Kane et al. .................. 704/233 |
| 6,144,179 | A | * | 11/2000 | Kessler et al. ............... 318/565 |
| 6,456,028 | B1 | * | 9/2002 | Aoki et al. .................. 318/470 |
| 6,459,223 | B1 | * | 10/2002 | Mauel et al. ............... 318/445 |
| 6,559,616 | B1 | * | 5/2003 | Aoki et al. .................. 318/567 |
| 6,628,893 | B1 | * | 9/2003 | Ohno et al. .................. 388/800 |
| 2003/0122515 | A1 | * | 7/2003 | Lutter et al. ................. 318/466 |
| 2003/0137857 | A1 | * | 7/2003 | Yamanaka et al. ........... 363/132 |

FOREIGN PATENT DOCUMENTS

| | | |
|---|---|---|
| EP | 1 043 590 A1 | 3/2000 |
| JP | 07245979 A * | 9/1995 |

* cited by examiner

METHOD FOR DETERMINING THE FREQUENCY OF THE CURRENT RIPPLE IN THE ARMATURE CURRENT OF A COMMUTATED DC MOTOR

CROSS-REFERENCE TO RELATED APPLICATIONS

This is a continuation of International Application PCT/EP02/05877, published in German, with an international filing date of May 29, 2002, which claims priority to DE 101 26 168.3 filed on May 30, 2001.

BACKGROUND OF THE INVENTION

1. Field of the Invention

The present invention relates to a method for determining the frequency of the current ripple contained in the armature current signal of a commutated direct current (DC) motor.

2. Background Art

The armature current signal of a commutated DC motor includes a direct component and a ripple component superimposed on the direct component. The ripple component arises when the motor is operated as a consequence of the interaction of the magnet (field), the armature winding, and the commutator of the motor. This expresses itself in a transient change in the induced voltage which produces the ripple content in the armature current signal. The current peaks contained in the armature current signal—referred to below as current ripples—occur when the armature of the motor rotates.

The number of current ripples in a full revolution of the armature corresponds to the number of armature collector bars. For example, if the armature has ten collector bars then the armature current signal will have ten current ripples. Thus, the number of counted current ripples is indicative of the actual rotational position of the motor's armature. Consequently, the counted current ripples is indicative of the position an element such as a motor vehicle window being driven by the motor along a predetermined travel segment.

In order to count the current ripples, the analog armature current signal is digitized. The number of current ripples counted in a certain time interval is the current ripple frequency. The current ripple frequency is indicative of the actual rotational speed of the motor.

To make it possible for current ripple detection to be performed with as few errors as possible, the analog armature current signal is conditioned before and possibly after digitization in order to suppress interference. Filtering is done to condition the armature current signal. The filtering may be in the form of low-pass filtering and/or frequency filtering.

For example, DE 195 11 307 C1 describes such a signal conditioning process. The purpose of such signal conditioning processes is to provide a precise armature current signal having minimal interference so that the current ripples contained in this conditioned armature current signal can be evaluated. To determine the position of the driven element, the current ripples in the conditioned armature current signal are counted. The counted result provides direct information regarding the actual rotational position of the drive shaft and the motor's armature. The current ripples contained in the armature current signal are usually counted using minima or maxima determination algorithms, or other algorithms to determine the zero crossings.

The previously known signal conditioning and correction processes can only sufficiently eliminate or minimize interference contained in the armature current signal if the current ripples contained in the armature current signal are distinct in the armature current signal. It is problematic, if not even impossible, to evaluate the current ripples contained in the armature current signal if interference or distortion are superimposed on the current ripples. This is apparent as the current ripple signal can be modeled as an interference signal whose frequency and amplitude change randomly, as a consequence of voltage fluctuations, for example.

SUMMARY OF THE INVENTION

Therefore, starting from the prior art, the present invention is based on the task of proposing a simplified method for determining the frequency of the current ripple contained in the armature current signal of a commutated direct current (DC) motor in which the method makes it possible to perform a reliable current ripple frequency and rotational motor speed determination if the armature current signal has superimposed interference.

The present invention determines the frequency of the current ripples contained in the armature current signal by taking the difference between the result of a spectral analysis of the armature current signal and the result of another spectral analysis of an electric motor operating parameter.

The method according to the present invention determines the current ripple frequency in the armature current signal by taking the difference between the results of two spectral analyses which are performed independently of one another. At least one spectral analysis result is obtained from the armature current signal. The other spectral analysis result is a corresponding result obtained from another electric motor operating parameter such as the motor voltage signal.

Both spectral analyses are performed by such means as a fast Fourier transform (FFT). The spectral analysis of the armature current signal converts the armature current signal into its frequency domain. The spectral analysis of the motor voltage signal converts the motor voltage signal into its frequency domain. The two spectral analyses results of the two frequency domains exhibit interference in the same way.

The current ripples contained in the armature current signal are readily apparent from the spectral analysis result of the armature current signal. The current ripples do not effect the motor voltage signal, or if they do the effect is greatly attenuated compared to the effect in the armature current signal. As such, current ripples effecting the motor voltage signal are relatively much less apparent in the spectral analysis result of the motor voltage signal.

Taking the difference of the two spectral analyses results eliminates the interference components which are apparent to the same extent in both spectral analyses results. The resulting difference is the actual value of the current ripple frequency. Thus, this subtraction between the two spectral analyses results eliminates all oscillations which are not caused by commutation but are caused by distortions in the motor voltage signal.

There is no effect due to the frequency components having any possible phase shifts caused by the respective operating state of the motor as the motor does not produce any shift in the frequency components. Instead, the motor adds new frequency components, namely the current ripple. Therefore, the method of the present invention is able to determine the frequency of the current ripple contained in the armature current signal even if the armature current signal has interference. A current ripple identification and a following rotational speed and position determination of the armature drive shaft are also possible if voltage fluctuations occur.

In such an embodiment in which the difference calculation uses the results of two spectral analyses, first of the armature current signal and second of the motor voltage signal, the difference calculation can be done simultaneously and thus with the data of the same sampling time point.

Another sample embodiment provides that both spectral analyses to be subtracted from one another use the armature current signal. In this case, it should be ensured that the armature current signal on which the spectral analyses are based has been recorded in different operational states of the motor. For example, the spectral analyses can be performed with the motor operating at different rotational speeds. The spectral analyses are then based on armature current signal data which is separated in time. This embodiment assumes that the interference is approximately constant within the time interval between when the first and the second spectral analyses are performed. It is expedient for this interval to be small. For example, the current ripple frequency can be determined each time the motor is started.

In theory, such a calculation can be made at every cycle of the digital sampling of the signal curves (e.g., armature current signal and motor voltage signal) entering into the evaluation. In DC motors which are always in operation for a short time, such as for example, motors for operating motor vehicle windows, it is expedient and also sufficient for the current ripple frequency to be determined every time the motor is started.

The frequency of the current ripples contained in the armature current signal determined in the way described above can be used directly, as a consequence of its proportionality to the motor's rotational speed, to make it possible to determine the rotational angle of the motor's armature shaft and the position of an element driven by the shaft.

Motor operating state changes cause a change in the frequency of the current ripples contained in the armature current signal. Consequently, changes in the frequency of the current ripple can be attributed directly to a change in the rotational speed of the motor.

To perform the spectral analysis of the analog armature current signal, the analog armature current signal is digitized and then transformed into its frequency domain by means of a fast Fourier transform. These process steps can be designed not to be computationally intensive. This also has the consequence that it is easy to perform these calculations at every point in time of the digital sampling of the analog armature current signal so that the rotational angle of the motor's drive shaft can be determined with a high time resolution. Consequently, this process can also be used for correction processes which require the motor's actual rotational speed. In particular, if the process steps are performed in step with the digital sampling, this process makes it possible to capture changes in the operational state of the motor virtually in real time, and thus also take them into consideration in determining the actual value of the rotational angle of the motor's armature.

In contrast to the prior art, the present invention does not perform any frequency filtering and instead determines the actual value of the current ripple frequency directly by blanking out frequency components which are superimposed on the armature current signal as interference. In the method of the present invention, the observed current ripple frequency is evaluated directly without theoretically requiring a separate prior current ripple detection or special signal conditioning. Therefore, this method is especially suitable to perform a sensorless position determination in commutated DC motors by taking advantage of the current ripple contained in the armature current signal.

Not only does the method of the present invention provide a way of determining and monitoring the actual value of the current ripple frequency when a DC motor is operated, but the method can also determine and monitor for abrupt changes in the current ripple frequency. When missed and/or double current ripples occur, there is an abrupt change in the actual value of the current ripple frequency. If such an abrupt change is detected in the actual value of the current ripple frequency it is then possible to make a correction in the current ripple counter result, and thus to make a correction in the position determination.

Detection of an abrupt change in the current ripple frequency can be subjected to a plausibility check, for example about the duration of the frequency change or about the frequency jump, in order to avoid, in this way, an interpretation of frequencies not induced by current ripple. Thus, such a correction process makes it simple to correct for missed and/or double current ripples without necessitating costly and computationally intensive algorithms to detect the missed and/or double current ripples.

BRIEF DESCRIPTION OF THE DRAWINGS

The present invention is explained below once again using the attached figures.

DETAILED DESCRIPTION OF THE PREFERRED EMBODIMENT(S)

Figure 1B:
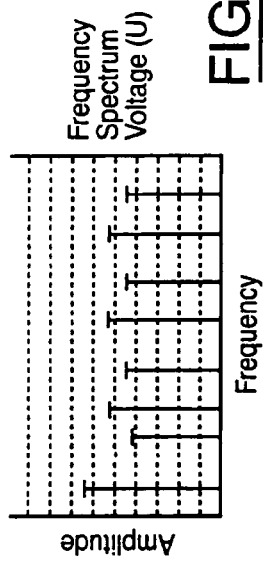
FIGS. 1A, 1B, 1C, 2A, and 2B illustrate diagrams showing how the difference between the results of two spectral analyses is formed in order to determine the current ripple frequency in the armature current signal of a commutated direct current (DC) motor.
Figure 1C:
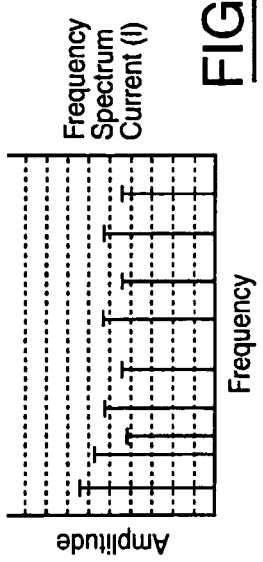
Figure 1A:
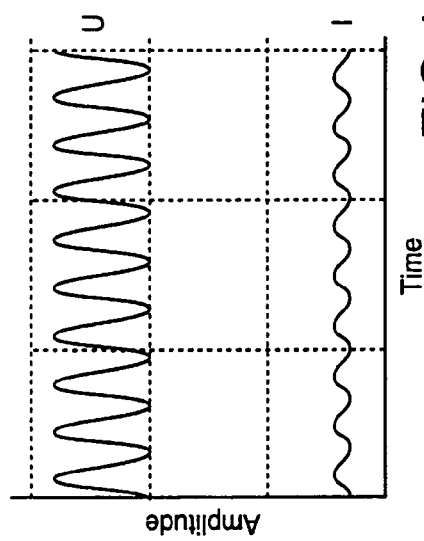

In a commutated direct current (DC) motor the motor voltage signal and motor armature current signal are monitored. The signal curves of the motor voltage and of the motor armature current are reproduced in the diagram of FIG. 1A in which the motor voltage signal is marked with U and the motor armature current signal is marked with I. The irregularity of the armature current signal I shows that it contains not only the current ripple signal, but also contains other superimposed oscillations, for example, the ripple content of a motor vehicle electrical system if the motor is used as a motor vehicle window motor, for example.

The superimposed oscillations in the armature current signal I, for example those of the ripple content in the electrical system, are also apparent in the motor voltage signal U. The current ripples contained in the armature current signal I are not typically contained in the motor voltage signal U and if they are contained in the motor voltage signal U they are much more attenuated.

These relationships are used to determine the current ripple frequency. To accomplish this, the motor voltage signal U is transformed into the frequency domain by a fast Fourier transform, for example, so that a spectral analysis can be performed. A corresponding transform is also performed of the armature current signal I into the frequency domain. The two frequency spectra of the motor voltage and motor current signals are respectively plotted in FIGS. 1B and 1C.

Figure 2B:
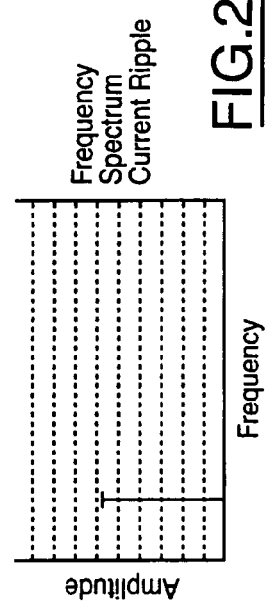

The two frequency spectra reflect the oscillation frequencies involved in bringing about the respective signal curves U and I. Subtracting these two frequency spectra from one another eliminates the interference contained in the two frequency spectra so that the result retains the current ripple frequency, which is what is decisive in the armature current signal I. FIG. 2B illustrates the frequency spectral result obtained from subtracting from one another the frequency spectra results of the motor voltage signal U and the armature current signal I. The frequency spectral result illustrated in FIG. 2B is the frequency spectrum result of the current ripple, the result being the determined current ripple frequency. The determined current ripple frequency can then undergo a subsequent evaluation, for example, for a determination of the actual value of the rotational speed of the DC motor and for a determination of the rotational position of its drive shaft or the position of an element driven by the drive shaft.

Figure 2A:
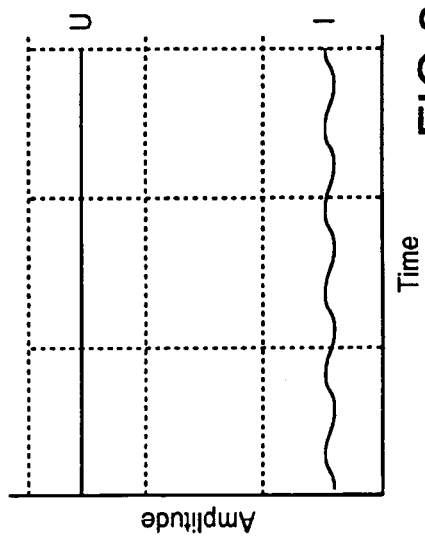

FIG. 2A is a plot of the motor voltage signal U which has had the interference, for example the ripple content in the electrical system, purged from it, and the correspondingly purged armature current signal I. The armature current signal I now reproduces exclusively the ripple content of the current ripple. FIG. 2A makes clear only the result of the difference taken between the two frequency spectra used in this sample embodiment.

Monitoring the current ripple frequency according to motor rotational speed allows the monitoring of changes in the current ripple frequency as the interference superimposed on the current ripple frequency by such a change is eliminated and ignored. Such interference which is caused by the commutator also changes its frequency when the rotational speed changes, so that in theory this interference can also be observed.

If missed or double current ripples occur, the current ripple frequency changes abruptly, so that this can also be detected with the method of the present invention. Missed or double current ripples appear for only a short time and can be identified in the interference spectrum due to this property, for example.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for determining a frequency of current ripples contained in an armature current signal of a commutated direct current (DC) motor, the method comprising:
    determining a frequency spectral result of the armature current signal of the motor in which the armature current signal contains current ripples and interference;
    determining a frequency spectral result of a voltage signal of the motor in which the voltage signal contains the interference;
    determining a frequency spectral result of the current ripples contained in the armature current signal based on differences between the frequency spectral result of the armature current signal and the frequency spectral result of the motor voltage signal such that the determined frequency spectral result of the current ripples contained in the armature current signal is void of frequency components which are superimposed on the armature current signal as the interference; and
    determining the frequency of the current ripples contained in the armature current signal from the determined frequency spectral result of the current ripples contained in the armature current signal.

2. The method of claim 1 wherein the armature current signal is an analog armature current signal, the method further comprising:
    digitizing the analog armature current signal;
    wherein determining the frequency spectral result of the armature current signal includes determining the frequency spectral result of the digitized armature current signal.

3. The method of claim 1 wherein:
    determining the frequency spectral results of the armature current signal and the motor voltage signal includes using a fast Fourier transform on the armature current signal and the motor voltage signal to determine the frequency spectral results of the armature current signal and the motor voltage signal.

4. The method of claim 1 wherein:
    the frequency of the current ripples is determined during a start-up phase of the motor.

5. The method of claim 1 further comprising:
    determining rotational speed of a drive shaft of the motor based on the frequency of the current ripples; and
    determining rotational position of the drive shaft based on the rotational speed of the drive shaft.

6. The method of claim 5 further comprising:
    monitoring the frequency of the current ripples for changes during operation of the motor.

7. The method of claim 6 further comprising:
    counting the current ripples contained in the armature current signal; and
    modifying the number of counted current ripples as a function of a change in the frequency of the current ripples during the operation of the motor.

8. A method for determining the a frequency of current ripples contained in an armature current signal of a commutated direct current (DC) motor, the method comprising:
    determining a frequency spectral result of the armature current signal of the motor in which the armature current signal contains current ripples and interference;
    determining a frequency spectral result of a voltage signal of the motor in which the motor voltage signal contains the interference;
    determining a frequency spectral result of the current ripples contained in the armature current signal based on differences between the frequency spectral result of the armature current signal and the frequency spectral result of the motor voltage signal such that the determined frequency spectral result of the current ripples contained in the armature current signal is void of frequency components which are superimposed on the armature current signal as the interference without filtering any of the frequency spectral results of the armature current signal and the motor voltage signal; and determining the frequency of the current ripples contained in the armature current signal from the determined frequency spectral result of the current ripples contained in the armature current signal.

9. The method of claim 8 wherein the armature current signal is an analog armature current signal, the method further comprising:
    digitizing the analog armature current signal;
    wherein determining the frequency spectral result of the armature current signal includes determining the frequency spectral result of the digitized armature current signal.

10. The method of claim 8 wherein:
    determining the frequency spectral results of the armature current signal and the motor voltage signal includes using a fast Fourier transform on the armature current signal and the motor voltage signal to determine the frequency spectral results of the armature current signal and the motor voltage signal.

11. The method of claim 8 wherein:
the frequency of the current ripples is determined during a start-up phase of the motor.

12. The method of claim 8 further comprising:
determining rotational speed of a drive shaft of the motor based on the frequency of the current ripples; and
determining rotational position of the drive shaft based on the rotational speed of the drive shaft.

13. The method of claim 12 further comprising:
monitoring the frequency of the current ripples for changes during operation of the motor.

14. The method of claim 13 further comprising:
counting the current ripples contained in the armature current signal; and
modifying the number of counted current ripples as a function of a change in the frequency of the current ripples during the operation of the motor.

* * * * *